US009735514B2

(12) United States Patent
Salloum et al.

(10) Patent No.: US 9,735,514 B2
(45) Date of Patent: Aug. 15, 2017

(54) CONNECTOR MODULE WITH INTERNAL WIRELESS COMMUNICATION DEVICE

(71) Applicant: Mellanox Technologies Ltd., Yokneam (IL)

(72) Inventors: Sami Salloum, Haifa (IL); Rabie Loulou, Nazareth (IL); Wasim Abu Moch, Baqa Algarbiya (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 112 days.

(21) Appl. No.: 14/662,258

(22) Filed: Mar. 19, 2015

(65) Prior Publication Data

US 2016/0276784 A1    Sep. 22, 2016

(51) Int. Cl.
| | |
|---|---|
| H01R 13/66 | (2006.01) |
| H01R 29/00 | (2006.01) |
| H04M 1/725 | (2006.01) |
| H04W 88/02 | (2009.01) |

(52) U.S. Cl.
CPC ......... *H01R 13/6691* (2013.01); *H01R 29/00* (2013.01); *H04M 1/7253* (2013.01); *H01R 13/6658* (2013.01); *H04M 2250/04* (2013.01); *H04W 88/02* (2013.01)

(58) Field of Classification Search
CPC ..... H04W 88/02; H04W 8/005; H04W 76/02; H04M 1/7253; H04M 2250/04
See application file for complete search history.

(56) References Cited

U.S. PATENT DOCUMENTS

| | | |
|---|---|---|
| 3,349,163 A | 10/1967 | Rocton |
| 3,816,673 A | 6/1974 | Miya |
| 4,767,173 A | 8/1988 | Priaroggia |
| 5,412,716 A | 5/1995 | Blaha |
| 5,876,239 A | 3/1999 | Morin et al. |

(Continued)

FOREIGN PATENT DOCUMENTS

| | | |
|---|---|---|
| CN | 1917098 A | 2/2007 |
| CN | 202404636 U | 8/2012 |

(Continued)

OTHER PUBLICATIONS

"SFF-8431 Specifications for Enhanced Small Form Factor Pluggable Model SFP+", Revision 4.1, Jul. 6, 2009.

(Continued)

*Primary Examiner* — Gbemileke J Onamuti
(74) *Attorney, Agent, or Firm* — D.Kligler IP Services Ltd.

(57) ABSTRACT

A connector module includes a signal interface, a wireless communication module and a connector housing. The signal interface is configured to exchange signals between a cable and a communication unit when the connector module is connected to the communication unit. The wireless communication module is configured to exchange information in a first mode between the communication unit and a wireless terminal when the connector module is connected to the communication unit, and, when the connector module is disconnected from the communication unit, to exchange information in a second between a memory internal to the connector module and the wireless terminal mode. The connector housing contains the signal interface and the wireless communication module.

23 Claims, 4 Drawing Sheets

(56) References Cited

U.S. PATENT DOCUMENTS

| | | |
|---|---|---|
| 6,449,258 B1 | 9/2002 | Grammel |
| 6,975,242 B2 | 12/2005 | Dannenmann et al. |
| 7,045,717 B2 | 5/2006 | Kolvick et al. |
| 7,107,414 B2 | 9/2006 | Hidai et al. |
| 7,260,302 B2 | 8/2007 | Caveney |
| 7,321,313 B1 | 1/2008 | Inlow |
| 7,760,094 B1 | 7/2010 | Kozischek et al. |
| 8,010,999 B2 | 8/2011 | Fujita et al. |
| 8,903,683 B2 | 12/2014 | Shilo et al. |
| 9,111,466 B2 | 8/2015 | Dor et al. |
| 2004/0065470 A1 | 4/2004 | Goodison et al. |
| 2004/0065741 A1 | 4/2004 | Reddersen et al. |
| 2004/0118925 A1 | 6/2004 | Kelly et al. |
| 2007/0004241 A1 | 1/2007 | Meier et al. |
| 2008/0031576 A1 | 2/2008 | Hudgins |
| 2008/0172722 A1 | 7/2008 | Fujita et al. |
| 2008/0314979 A1 | 12/2008 | Johnsen et al. |
| 2008/0318465 A1 | 12/2008 | Johnsen et al. |
| 2009/0269943 A1 | 10/2009 | Palli et al. |
| 2010/0028014 A1 | 2/2010 | Hosking |
| 2010/0054749 A1 | 3/2010 | Hosking |
| 2010/0098412 A1 | 4/2010 | Boyd et al. |
| 2010/0111476 A1 | 5/2010 | Shirk et al. |
| 2010/0176962 A1 | 7/2010 | Yossef |
| 2010/0238020 A1 | 9/2010 | Pellen |
| 2011/0096781 A1* | 4/2011 | Aybay ................ H04L 12/5601 370/392 |
| 2012/0187964 A1 | 7/2012 | Michaelis et al. |
| 2013/0028157 A1* | 1/2013 | Ruster ............... H04W 52/0206 370/311 |
| 2014/0105029 A1 | 4/2014 | Jain et al. |
| 2015/0009893 A1* | 1/2015 | Koyama ............... H04W 40/02 370/328 |
| 2015/0051870 A1 | 2/2015 | Shilo et al. |

FOREIGN PATENT DOCUMENTS

| | | |
|---|---|---|
| GB | 774026 A | 5/1957 |
| JP | 05161224 A2 | 6/1993 |
| JP | 2006271154 A | 10/2006 |
| JP | 2007140886 A | 6/2007 |

OTHER PUBLICATIONS

"INF-8438i Specification for Quad Small Form-factor Pluggable (QSPF) Transceiver Specifications", Revision 1.0, Nov. 2006.

Tamanuki et al., High Density Packaged 4-Channel Transceiver for Metro and Access Applications, IEEE Electronic Components and Technology Conference, pp. 1050-1056, 2005.

CN Application # 2014100122899 Office Action dated Mar. 1, 2017.

* cited by examiner

CONNECTOR MODULE WITH INTERNAL WIRELESS COMMUNICATION DEVICE

FIELD OF THE INVENTION

The present invention relates generally to networking equipment, and particularly to wireless communication with connector modules conveying communication signals.

BACKGROUND OF THE INVENTION

Communication units such as network switches are typically connected to one another using interconnecting cables. Such cables may comprise, for example, passive or active electrical cables, or Active Optical Cables (AOC). Various techniques for identifying and managing cables are known in the art. For example, Japan Patent JP2007140886, to Kenji et al., whose disclosure is incorporated herein by reference, describes a method and a cable incorporating an RFID tag. An abstract of the disclosure states that according to the method, with the cable incorporating the RFID tags, a user does not need to write information in the RFID tag and the cable can easily and inexpensively be identified on the spot for a long period of time.

Documents incorporated by reference in the present patent application are to be considered an integral part of the application except that, to the extent that any terms are defined in these incorporated documents in a manner that conflicts with definitions made explicitly or implicitly in the present specification, only the definitions in the present specification should be considered.

SUMMARY OF THE INVENTION

An embodiment that is described herein provides a connector module including a signal interface, a wireless communication module and a connector housing. The signal interface is configured to exchange signals between a cable and a communication unit when the connector module is connected to the communication unit. The wireless communication module is configured to exchange information in a first mode between the communication unit and a wireless terminal when the connector module is connected to the communication unit, and, when the connector module is disconnected from the communication unit, to exchange information in a second between a memory internal to the connector module and the wireless terminal mode. The connector housing contains the signal interface and the wireless communication module.

In some embodiments, the connector module is permanently connected to the cable. In other embodiments, the connector module is detachable from the cable. In an embodiment, when the connector module is connected to the communication unit, the wireless communication module is configured to exchange information between the wireless terminal and both the communication unit and the memory.

In some embodiments, the wireless communication module is configured to receive electrical power from the communication unit when the connector module is connected to the communication unit, and, when the connector module is disconnected from the communication unit, to harvest the electrical power from electromagnetic energy transmitted by the wireless terminal.

In an embodiment, the wireless communication module is configured to exchange with the wireless terminal first information when the connector module is connected to the communication unit, and second information, different from the first information, when the connector module is disconnected from the communication unit. In another embodiment, the wireless communication module is configured to automatically select the first or the second mode by detecting whether the connector module is connected to the communication unit.

In an embodiment, the connector module and the cable are part of an active optical cable. In yet another embodiment, the connector module and the cable are part of an active electrical cable. In still another embodiment, the connector module and the cable are part of a passive electrical cable.

There is additionally provided, in accordance with an embodiment of the present invention, a method of operating a connector module. When the connector module is connected to a communication unit, signals are exchanged between the communication unit and a cable, and information is exchanged in a first mode between the communication unit and a wireless terminal. When the connector module is disconnected from the communication unit, information is exchanged in a second mode between an internal memory of the connector module and the wireless terminal.

There is further provided, in accordance with an embodiment of the present invention, a cable assembly including a cable and a connector module. The connector module is configured, when the cable assembly is connected to a communication unit, to exchange signals between the cable and the communication unit and to exchange information in a first mode between the communication unit and a wireless terminal, and, when the cable assembly is disconnected from the communication unit, to exchange information in a second between an internal memory and the wireless terminal mode.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved connector modules for use in cables that interconnect communication units. In the context of the present patent application and in the claims, the term "connector module" refers to various types of modules that are used for terminating a cable and connecting the cable to a communication unit. Examples of connector modules include, but are not limited to, optical-electrical interface modules that terminate Active Optical Cables (AOCs), and active or passive electrical interfaces or connectors that terminate copper cables. Moreover, the term "connector module" refers both to modules that are permanently connected to the end of a cable, and to standalone detachable modules that can be connected to and disconnected from the end of a cable.

In some embodiments, a connector module comprises a wireless communication module that is configured to exchange information over a wireless link with a wireless terminal, such as a smart-phone, typically for logistics and management purposes. The connector module is configured to operate in one of two operational modes, depending on whether it is connected to the communication unit or not.

In a first operational mode, when connected to the communication unit, the connector module receives electrical power from the communication unit, and may be connected to the communication unit using a sideband management interface. In this mode, the wireless terminal is able to access the information stored in the internal memory of the connector module, and also to communicate with the communication unit.

In a second operational mode, when disconnected from the communication unit, the connector module harvests electrical power from the wireless terminal. In this mode, the wireless terminal may only access the information stored in the internal memory of the connector module. Other functionalities of the connector module may also be limited in this mode, e.g., because of the limited electrical power.

The connector module is typically configured to identify whether it is connected to the communication unit or not, and to switch accordingly between the first and second operational modes.

System Description

Figure 1:
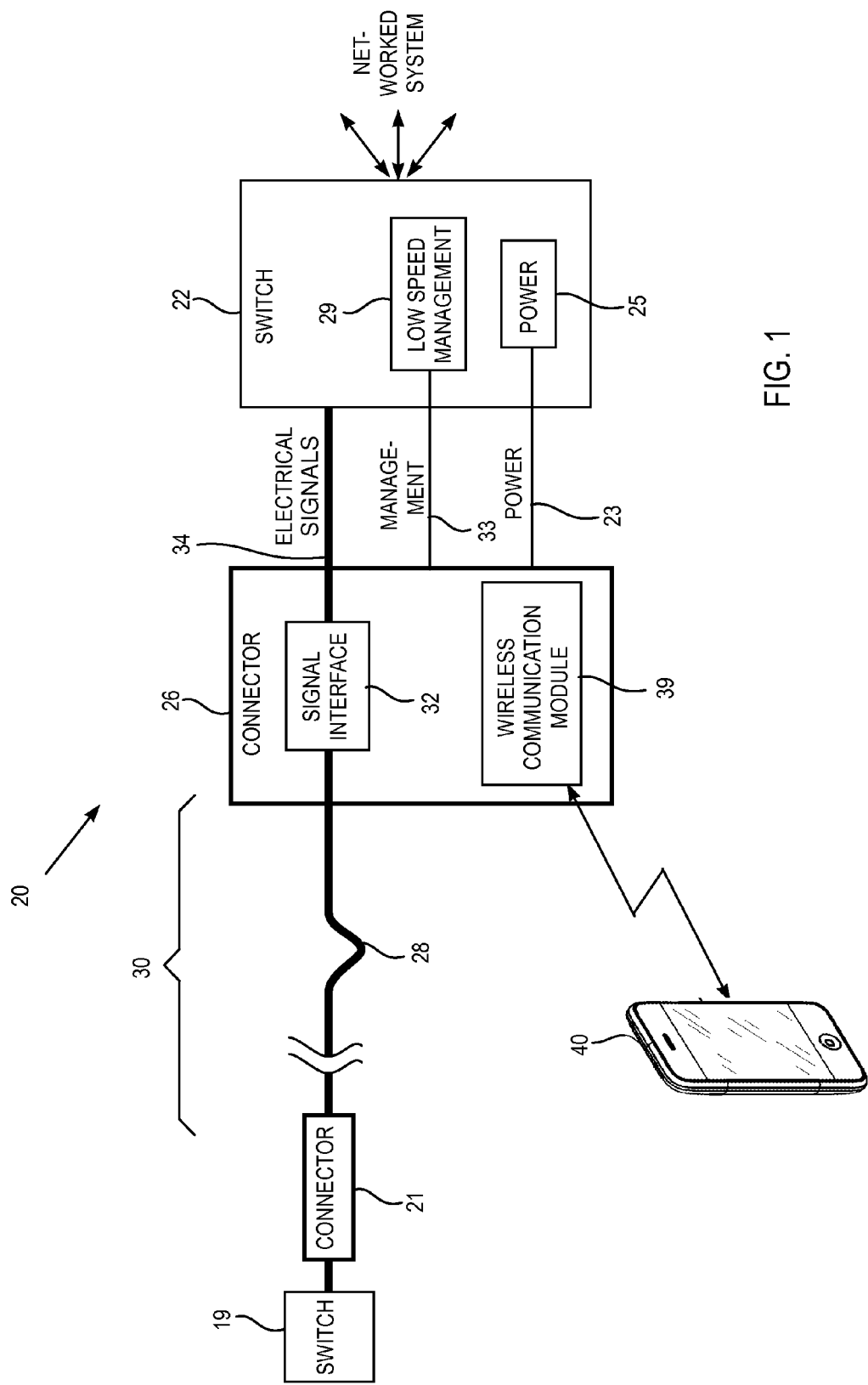
FIG. 1 is a block diagram that schematically illustrates a communication system, in accordance with an embodiment of the present invention.

FIG. 1 is a block diagram that schematically illustrates a communication system 20, in accordance with an embodiment of the present invention. In system 20, a cable assembly 30 connects between communication units 19 and 22. Cable assembly 30 comprises a cable 28 that is terminated by a connector module 26 which connects to unit 22, and by a connector module 21 which connects to unit 19.

Communication units 19 and 22 may comprise, for example, host computers or switches of an Ethernet or Infiniband network, and are also referred to herein as switches 19 and 22. The terms "switch," "host" and "communication unit" are therefore used interchangeably herein.

Connector module 26 is described in greater detail below. In some embodiments connector module 26 is detachable from cable 28. In alternative embodiments connector module 26 is formed as an integrated permanently-connected termination of cable assembly 30.

Cable 28 may comprise, for example, multiple copper wires or a bundle of optical fibers. Accordingly, connector module 26 may comprise, for example, a passive connector module that connects the copper wires to switch 22, or an active optical-electrical interface module that converts between optical signals traversing cable 28 and electrical signals exchanged with switch 22.

Connector module 26 comprises a signal interface 32 which exchanges high-speed electrical communication signals with switch 22 on electrically conductive lines 34. This high-speed interface is used for conveying the high-speed signals between switches 19 and 22 over cable 28.

In some embodiments, e.g., when cable assembly 30 comprises a passive electrical cable, interface 32 comprises a simple passive electrical interface, such as a set of pins and/or mating sockets that transfer electrical signals between lines 34 and respective wires of cable 28.

In alternative embodiments interface 32 comprises an active electrical interface, which typically converts electrical communication signals on lines 34 to electrical communication signals in a differing format on elements 28, and vice versa. In both these embodiments cable 28 comprises electrically conductive lines, typically formed of copper.

In further alternative embodiments, e.g., when cable assembly 30 comprises an AOC, interface 32 comprises an active optical-electrical interface which converts between electrical communication signals on lines 34 and optical communication signals on the optical fibers of cable 28.

In addition to the high-speed interface described above, connector module 26 is connected to switch 22 using a sideband management interface using lines 33, and receives electrical power from switch 22 over power lines 23. To perform these transfers, switch 22 comprises a power connection interface 25 and a low speed management interface 29. The power connection interface is configured to supply power to connector module 26 while the connector module is connected to switch 22. Management interface 29, which may use a bus such as an $I^2C$ (Inter-Integrated Circuit) bus, may be configured by switch 22 to read, write and configure low speed communication information between switch 22 and connector module 26.

Connector 26 further comprises a wireless communication module 39 which is configured to exchange information with a wireless terminal 40, such as a mobile phone. Typically, communication between module 39 and terminal 40 is carried out while the terminal is located in close proximity (e.g., on the order of 10 cm) to module 39. Generally, however, the disclosed techniques are not limited to short-range communication.

Connector module 21 is typically similar to connector module 26. In an embodiment, connector module 21 does not comprise a wireless communication module. In other words, a wireless communication module is typically fitted on only one side of cable assembly 30. In other embodiments, however, connector modules 26 and 21 both comprise wireless communication modules such as module 39.

Figure 2:
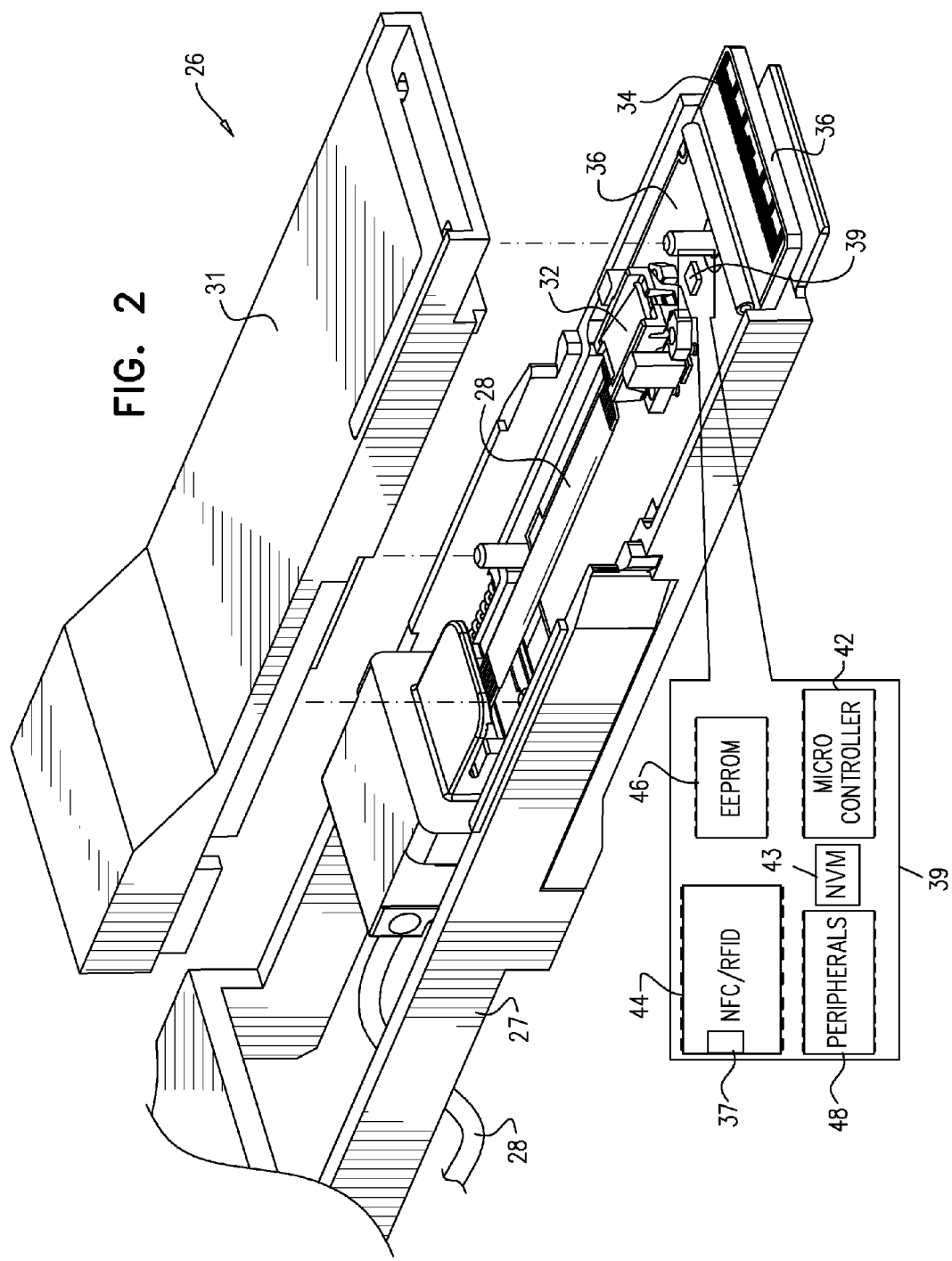
FIG. 2 is a schematic pictorial illustration of a connector, in accordance with an embodiment of the present invention.

FIG. 2 is a schematic pictorial exploded illustration of connector module 26, in accordance with an embodiment of the present invention. A connector housing 27 comprises a handle (not shown), a top cover 31, and a printed circuit board (PCB) 36. The handle inserts/ejects PCB 36 to/from a socket in a port of switch 22. When connector module 26 is connected to switch 22, PCB 36 conducts electrical communication signals, via lines 34, to interface 32, which is connected to cable 28. Cable 28 carries the communication signals between connector module 26 and connector module 21 connected to switch 19 at the remote end of cable assembly 30 (FIG. 1).

As stated above, connector module 26 further comprises wireless communication module 39. The wireless communication module is described with respect to FIGS. 3-4 below, and comprises a wireless device 44, a micro-controller 42, a non-volatile memory (NVM) 43, an Electrically Erasable Programmable Read-Only Memory (EEPROM) 46, and peripherals 48, such as light emitting diodes (LEDs) and/or sensors. Wireless device 44 may comprise, for example, a Radio-Frequency Identification (RFID) or Near-Field Communication (NFC) device.

Module 39 comprises an antenna 37, which may be integrated into module 39, typically as part of device 44. In an alternative embodiment, the antenna is external to module 39. Typically, the antenna is located in a region within or near the module having as little electrical shielding as possible, so that the antenna operates efficiently.

Figure 3:
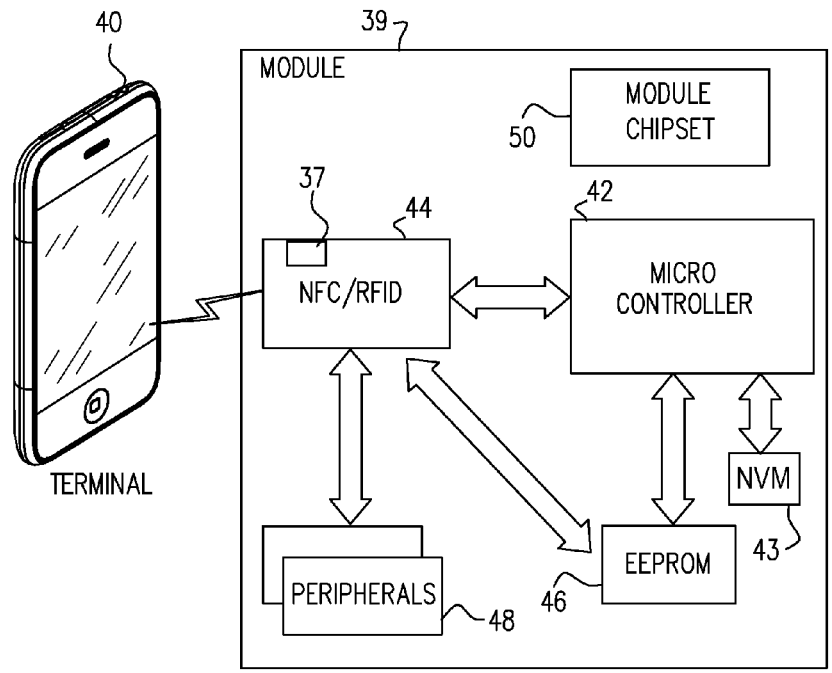
FIG. 3 is a block diagram that schematically illustrates a wireless communication module and a wireless terminal, in accordance with an embodiment of the present invention.
Figure 4:
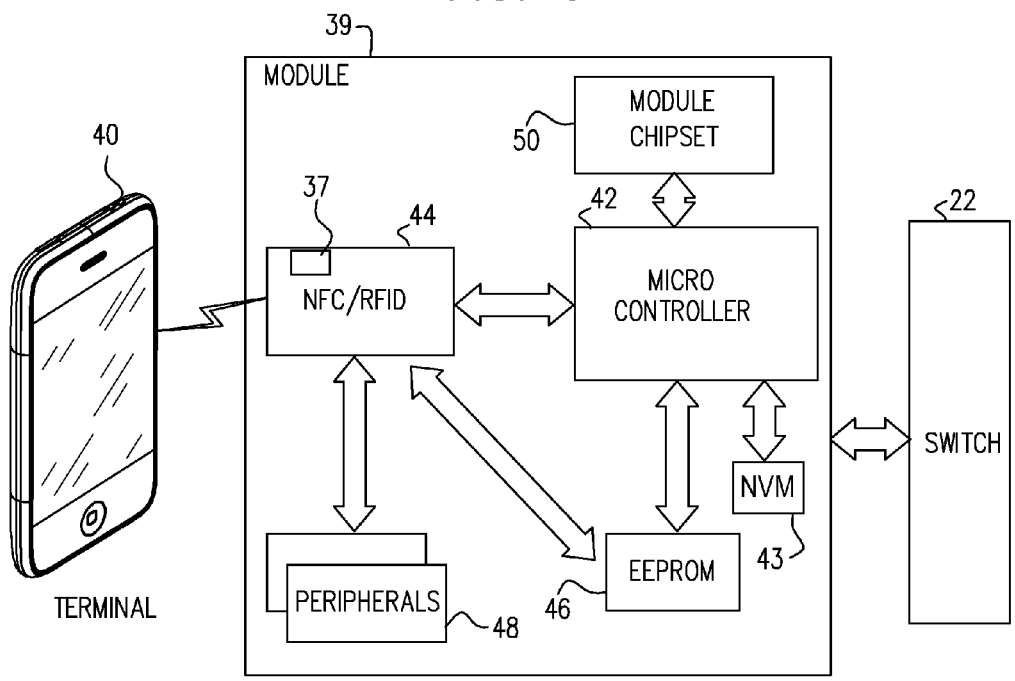
FIG. 4 is a block diagram that schematically illustrates the wireless communication module, and the wireless terminal, in accordance with an alternative embodiment of the present invention.

FIGS. 3 and 4 are block diagrams that schematically illustrate wireless communication module 39 and wireless terminal 40 in two respective operational modes, in accordance with an embodiment of the present invention. In the operational mode of FIG. 3, connector module 26 is assumed to be disconnected from switch 22, so that no electrical power is transferred from the switch via lines 23 (FIG. 1) to the connector module. In this mode, module 39 may be configured to harvest electrical power from electromagnetic radiation incident on antenna 37.

Micro-controller 42 connects to device 44, memory 46, and NVM 43. In some embodiments NVM 43 may be separate from micro-controller 42; alternatively NVM 43 may be formed as an integral part of the micro-controller. NVM 43 is configured to store information regarding the signals transferred via interface 32, the information being acquired while connector module 26 (and cable assembly 30) is connected to switch 22. (As described below, micro-controller 42 may send the information stored in NVM 43 later to another entity in system 20, such as device 44.)

While connector module 26 is disconnected from switch 22, the power harvested by antenna 37 may be used to power one or more other devices within module 39 (as well as wireless device 44). For example, the harvested power may be configured to operate micro-controller 42, memory 46, NVM 43, and/or peripherals 48. When operational, micro-controller 42 is typically configured to register that connector module 26 and cable assembly 30 are disconnected from switch 22.

In the power harvesting mode described above, wireless device 44 may also be configured to read stored data from onboard devices, such as NVM 43 and memory 46, and/or from sensors comprised in peripherals 48. Wireless device 44 may also be configured to read dynamic data, such as a link status and/or properties of cable assembly 30, which may be stored in memory 46 or NVM 43.

Module 39 comprises a module chipset 50. The module chipset comprises one or more chips that, inter alia, control components comprised in interface 32, when the interface is an active electrical or optical interface, as is described above. Due to the limited power available in the power harvesting mode, module chipset 50 is typically not operative when connector 26 is disconnected from switch 22.

As stated above, micro-controller 42 may be configured to register that cable assembly 30 is disconnected from switch 22. As described below, the micro-controller is also configured to identify when the cable assembly is connected to the switch, and so is able to alternate between operating in the first and second communication modes of module 39, as is described with regard to FIG. 5 below.

In some embodiments, micro-controller 42 communicates with device 44 using a proprietary communication interface or a standard bus interface, such as a Serial Peripheral Interface (SPI) bus or an Inter-Integrated Circuit (I2C) serial bus.

It will be understood that even when connector module 26 and cable assembly 30 are disconnected from switch 22, terminal 40 can read information (such as the link status and/or cable properties referred to above) stored in memory 46 and/or NVM 43.

In the operational mode of FIG. 4, connector module 26 and cable assembly 30 are assumed to be connected to switch 22, so that power is provided from the switch via lines 23 to the connector module, and so that low-speed management data may be transferred to and from the switch via lines 33 (FIG. 1).

The connection of connector module 26 to switch 22 connects module 39 to the switch. The connection may be detected by micro-controller 42, which responsively activates module chipset 50 to become operative and to communicate with the micro-controller.

While cable assembly 30 is connected to switch 22, micro-controller 42 may be configured to exchange information with terminal 40, via device 44. For example, micro-controller 42 may be configured to process requests from terminal 40, and to continuously provide terminal 40 with information regarding the configuration and dynamic status of module 39 and/or of cable assembly 30.

In addition, when cable assembly 30 is connected to switch 22, module 39 may be configured to retrieve static and dynamic data from switch 22 and to transmit the retrieved data to terminal 40, using a switch-to-module interface (such as an I2C bus). The retrieved data may comprise link status, counter data, switch identification (ID) data or any other suitable information. Typically, module 39 may also be configured to use the switch-to-module interface, so as to allow terminal 40 to set and read properties of switch 22.

The connector module and wireless module configurations of FIGS. 1-4 are example configurations that are depicted purely for the sake of conceptual clarity. In alternative embodiments, any other suitable configurations can be used. For example, the connector module may not necessarily comprise both NVM and EEPROM and may alternatively comprise only one memory type. Each of these memory types may comprise a standalone device, or it may be integrated in micro-controller 42, wireless module 44 or other component of the connector module.

Figure 5:
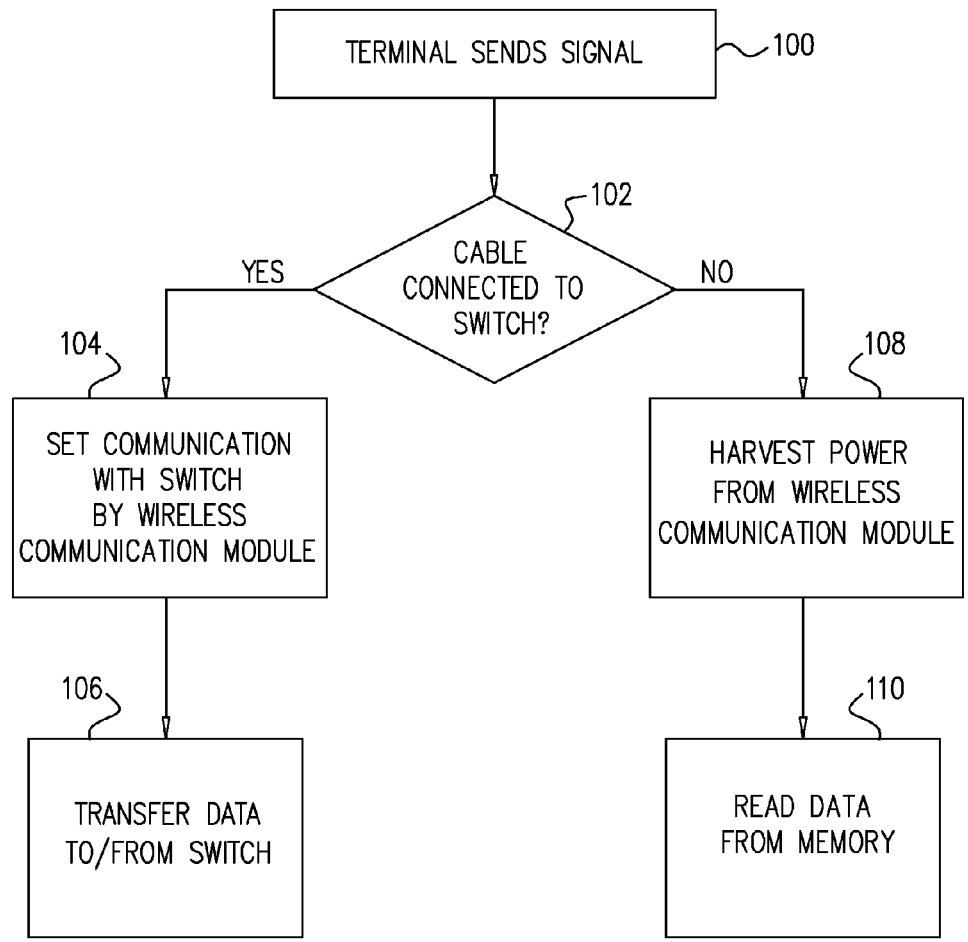
FIG. 5 is a flow chart that schematically illustrates a method for communication between a cable and an external wireless terminal, in accordance with an embodiment of the present invention.

FIG. 5 is a flow chart that schematically illustrates a method for communication between connector module 26 and external wireless terminal 40, in accordance with an embodiment of the present invention. The method involves two operational modes. In the first operational mode connector module 26 is connected to switch 22, and in the second operational mode the connector module is disconnected from the switch.

In the first mode, connector module 26 receives power from switch 22 on lines 23. In this mode the switch typically transmits high-speed signals on lines 34. The first mode typically enables monitoring and control of the signals, as well as the reading of dynamic data associated with the signals, using low-speed management signals on lines 33. In addition, in the first mode module 39 may be configured to allow communication between wireless terminal 40 and switch 22. The electrical power provided by switch 22 allows continuous operation of all the components and modules comprised in connector module 26, including module 39.

In the second operational mode, module 39 is disconnected from switch 22 and relies on the typically limited harvested electrical power derived from antenna 37. Thus, when the cable assembly is disconnected from the switch, module 39 typically limits the operations of its components and devices. For example, some of peripherals 48 and module chipset 50 may not be accessible or operational in the second mode. Typical operations in the second mode comprise access to NVM 43, memory 46 and/or to low-power consuming peripherals such as LEDs. The information sent to terminal 40 in the second mode is typically a subset of that sent in the first mode, although other information, such as acceptable connections to cable assembly 30, may be provided.

The method begins at a wireless signal transmission step 100, wherein terminal 40 transmits a wireless signal to module 39 while terminal 40 is close to module 39, so as to initiate communication between the terminal and the module. In some embodiments, the communication comprises information of the cable properties while examining the cable. For example, when replacing a cable, a user may read information from an old cable and apply the data for a new (successor) cable. Alternatively, the information may be used to debug a cable. In other embodiments, the information comprises switch-related parameters.

At a decision step 102, micro-controller 42 checks whether cable 30 is connected to switch 22, e.g., by monitoring the high-speed electrical signals in lines 34, management signals in lines 33 and/or the power on lines 23, so as to select between the first and second operational modes. If micro-controller 42 identifies that cable assembly 30 is connected to switch 22, then, at a communication setting step 104, module 39 is configured to open a communication channel between terminal 40 and switch 22, typically via wired communication on management lines 33 with the switch.

At a data transfer with switch step 106, module 39 transfers data between terminal 40 and switch 22 using the opened communication channel. An example of data that is transferred comprises error statistics of a link in the switch that is related to cable assembly 30. In some embodiments, module 39 may be configured to receive commands from terminal 40, and micro-controller 42 may be configured to decide whether to immediately respond to the commands from terminal 40 or to respond at a later time, for example, after collecting information from switch 22. The micro-controller may subsequently transmit a response to terminal 40 using the information collected.

If at decision step 102, micro-controller 42 identifies that cable assembly 30 is not connected to switch 22, then, at a power harvesting step 108, micro-controller 42 is configured to harvest operating power from antenna 37, and the power is used to operate micro-controller 42 and one or more other devices in module 39 (e.g., NVM 43 and/or memory 46).

At a data reading step 110, micro-controller 42 reads information stored in NVM 43 and commands device 44 to transmit the information to terminal 40. In some embodiments, the sensors of peripherals 48 collect signals that monitor the status of cable 30, and micro-controller 42 may command device 44 to transmit the signals to terminal 40.

The method of FIG. 5 is an example method that is depicted purely for the sake of conceptual clarity. In alternative embodiments, any other suitable method flow can be used.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. An apparatus, comprising:
 (i) a mechanical connector, which terminates a communication cable and comprises:
  one or more communication wire lines for exchanging communication signals between the communication cable and a mating connector of a communication unit; and
  one or more management wire lines for exchanging management signals between the communication unit and the mechanical connector;
 (ii) an internal memory mounted inside the mechanical connector; and
 (iii) a wireless communication module, which is mounted inside the mechanical connector and is configured to:
  in a first mode, in which the mechanical connector is connected to the communication unit, to exchange first management information between a wireless terminal and the communication unit, via the management signals on the one or more management wire lines; and
  in a second mode, in which the mechanical connector is detached from the mating connector of the communication unit, to exchange second management information between the wireless terminal and the internal memory inside the mechanical connector.

2. The apparatus according to claim 1, wherein the mechanical connector is permanently connected to the communication cable.

3. The apparatus according to claim 1, wherein the mechanical connector is detachable from the communication cable.

4. The apparatus according to claim 1, wherein, when the mechanical connector is connected to the mating connector of the communication unit, the wireless communication module is configured to exchange both the first management information between the wireless terminal and the communication unit, and the second management information between the wireless terminal and the internal memory.

5. The apparatus according to claim 1, wherein the wireless communication module is configured to receive electrical power from the communication unit when the mechanical connector is connected to the communication unit, and, when the mechanical connector is disconnected from the communication unit, to harvest the electrical power from electromagnetic energy transmitted by the wireless terminal.

6. The apparatus according to claim 1, wherein the first management information is different from the second management information.

7. The apparatus according to claim 1, wherein the wireless communication module is configured to automatically select the first or the second mode by detecting whether the mechanical connector is connected to the communication unit.

8. The apparatus according to claim 1, wherein the mechanical connector and the communication cable are part of an active optical cable.

9. The apparatus according to claim 1, wherein the mechanical connector and the communication cable are part of an active electrical cable.

10. The apparatus according to claim 1, wherein the mechanical connector and the communication cable are part of a passive electrical cable.

11. A method, comprising:
 when a mechanical connector, which terminates a communication cable, is connected to a mating connector of a communication unit, exchanging communication signals between the communication unit and the communication cable via one or more communication wire lines of the mechanical connector, and exchanging first management information in a first mode between the communication unit and a wireless terminal via one or more management wire lines of the mechanical connector; and when the mechanical connector is detached from the communication unit, exchanging second management information in a second mode between an internal memory mounted inside the mechanical connector and the wireless terminal.

12. The method according to claim 11, wherein the mechanical connector is permanently connected to the communication cable.

13. The method according to claim 11, wherein the mechanical connector is detachable from the communication cable.

14. The method according to claim 11, and comprising, in the first mode, exchanging both the first management information between the wireless terminal and the communication unit, and the second management information between the wireless terminal and the internal memory.

15. The method according to claim 11, and comprising receiving electrical power from the communication unit when the mechanical connector is connected to the communication unit, and, when the mechanical connector is detached from the communication unit, harvesting the electrical power from electromagnetic energy transmitted by the wireless terminal.

16. The method according to claim 11, wherein the second management information is different from the first management information.

17. The method according to claim 11, and comprising automatically selecting the first or the second mode by detecting whether the mechanical connector is connected to the communication unit.

18. The method according to claim 11, wherein the mechanical connector and the communication cable are part of an active optical cable.

19. The method according to claim 11, wherein the mechanical connector and the communication cable are part of an active electrical cable.

20. The method according to claim 11, wherein the mechanical connector and the communication cable are part of a passive electrical cable.

21. A communication cable assembly, comprising:
a communication cable; and
a mechanical connector, which terminates the communication cable and is configured:
when the mechanical connector is connected to a mating connector of a communication unit, to exchange communication signals between the communication cable and the communication unit via one or more communication wire lines of the mechanical connector, and to exchange first management information in a first mode between the communication unit and a wireless terminal via one or more management wire lines of the mechanical connector; and
when the mechanical connector is detached from the communication unit, to exchange second management information in a second mode between an internal memory mounted inside the mechanical connector and the wireless terminal.

22. The communication cable assembly according to claim 21, wherein the mechanical connector is permanently connected to the communication cable.

23. The communication cable assembly according to claim 21, wherein the mechanical connector is detachable from the communication cable.

* * * * *